United States Patent [19]

Bourret

[11] 4,224,755
[45] Sep. 30, 1980

[54] TRAWL-NET APPARATUS HAVING CONTROLLED NET OPENING AND CLOSING

[75] Inventor: Philippe Bourret, Noumea, New Caledonia

[73] Assignee: Agence Nationale de Valorisation de la Recherche (ANVAR), Neuilly sur Seine, France

[21] Appl. No.: 963,968

[22] Filed: Nov. 27, 1978

[30] Foreign Application Priority Data

Nov. 30, 1977 [FR] France ................ 77 36071

[51] Int. Cl.³ .................................... A01K 73/02
[52] U.S. Cl. ............................................. 43/9
[58] Field of Search ............... 43/7, 8, 9, 100, 104, 43/105

[56] References Cited

U.S. PATENT DOCUMENTS

| | | | |
|---|---|---|---|
| 2,721,411 | 10/1955 | Pederson | 43/9 |
| 3,412,498 | 11/1968 | Niskin | 43/9 |
| 3,461,591 | 8/1969 | Brown et al. | 43/9 |
| 3,688,433 | 9/1972 | Niskin | 43/7 |

FOREIGN PATENT DOCUMENTS

| | | | |
|---|---|---|---|
| 609882 | 12/1960 | Canada | 43/9 |
| 511922 | 6/1976 | U.S.S.R. | 43/9 |

*Primary Examiner*—Nicholas P. Godici
*Assistant Examiner*—K. Bradford Adolphson
*Attorney, Agent, or Firm*—Browdy and Neimark

[57] ABSTRACT

The trawl-net apparatus includes, between the net and the bottom, a closing-opening mechanism provided with a first control device. The mechanism holds the entrance of the bottom closed while leaving the rear of the net open. Under action of its control device, the rear of the net is caused to communicate with the entrance of the bottom. A folding over closing system is provided with a second control device and under the action of this control devices allows the mouth fold back rearwardly, then ensures, by a stopper, the closing of the mouth. The trawl-net with controlled opening and closing is advantageously used for selective gathering of pelgic micro-necton.

11 Claims, 11 Drawing Figures

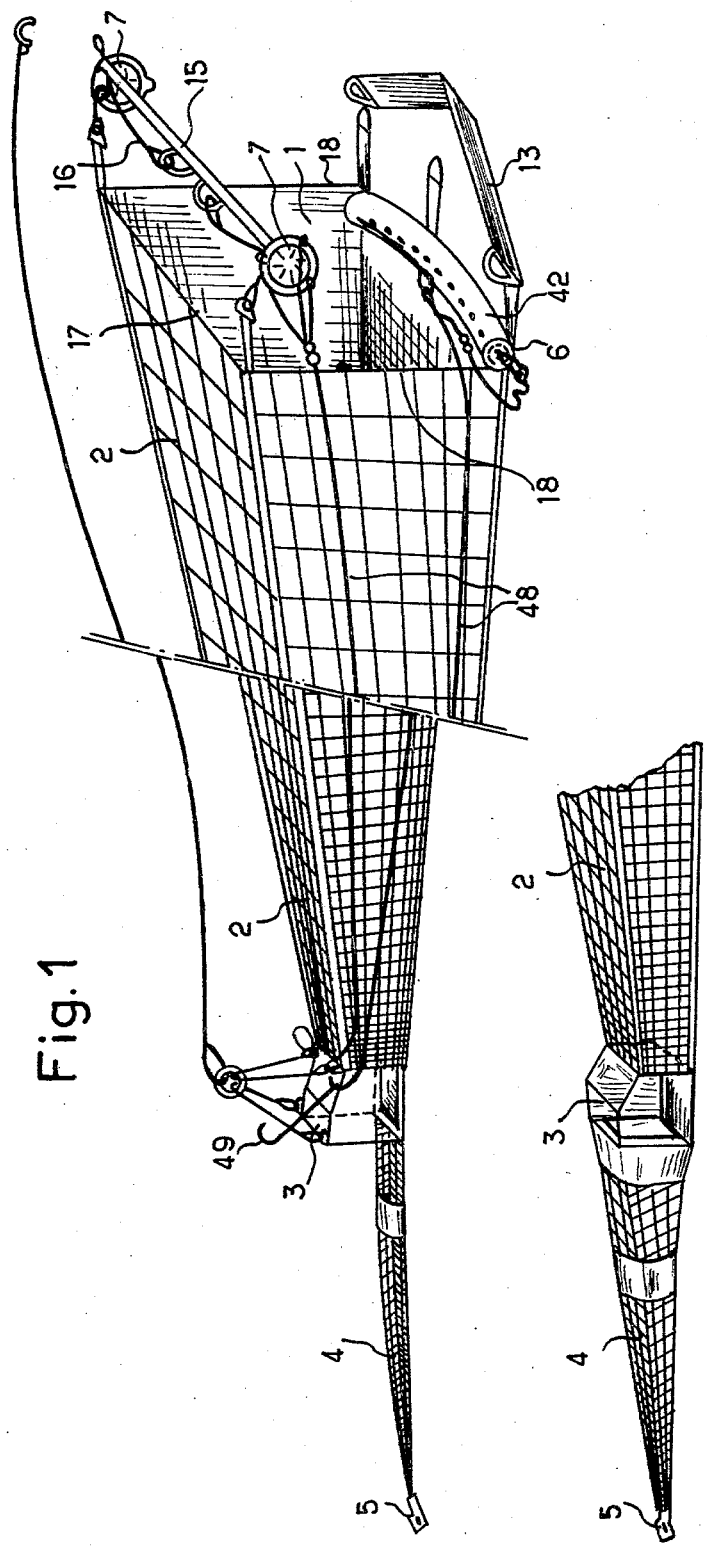

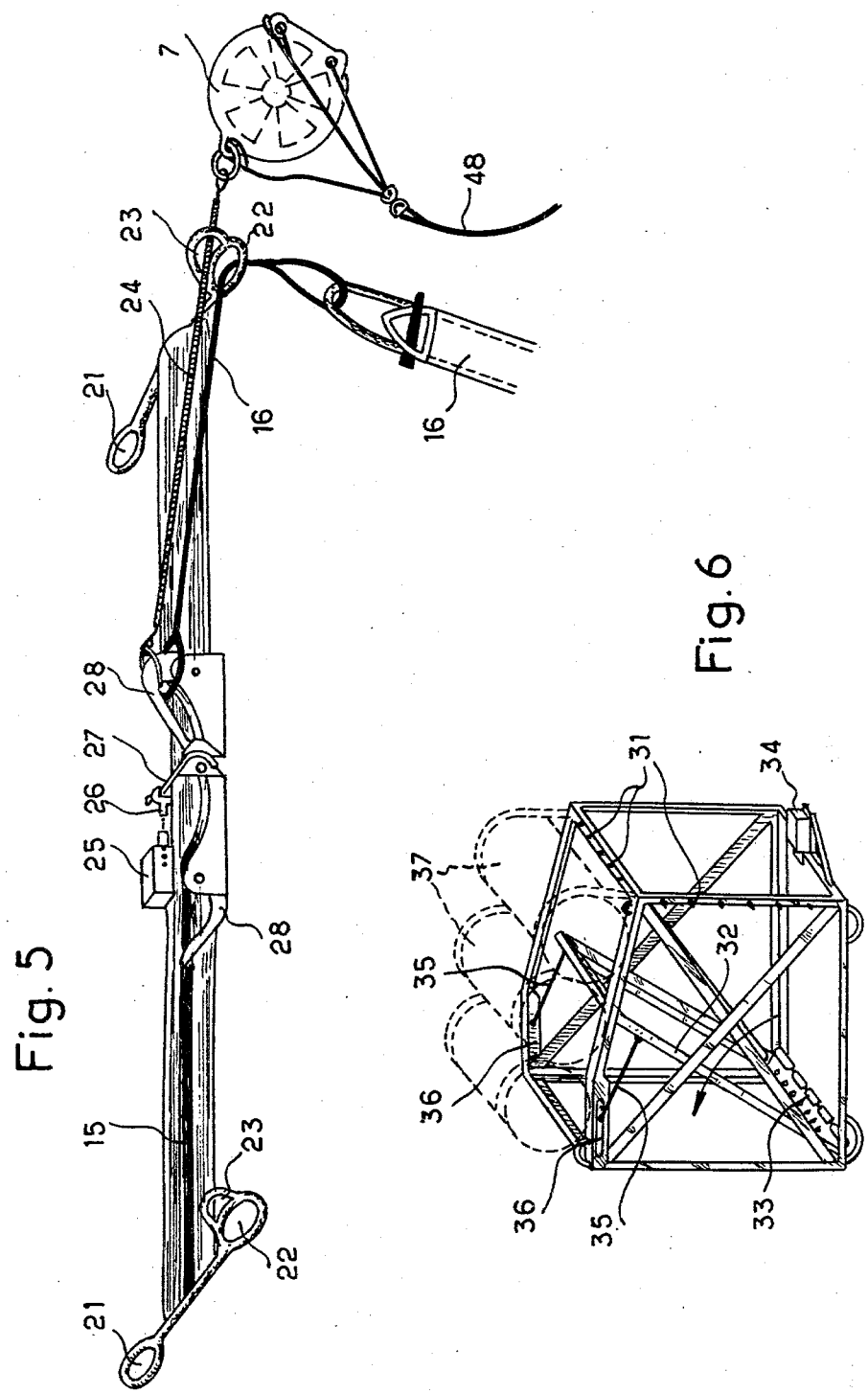

TRAWL-NET APPARATUS HAVING CONTROLLED NET OPENING AND CLOSING

BACKGROUND OF THE INVENTION

The present invention, realized at the Office de la Recherche Scientifique et Technique Outre Mer 24, rue Bayard 75008-PARIS, relates to a trawl-net apparatus with controlled opening and closing, able to be used particularly for selectively gathering pelagic micro-necton, as well as for gathering planktonic fauna.

The term micro-necton, in oceanology, encompasses active organisms (these are mostly crustaceans, cephalopoda, fish) whose size is between 1 and 10 cm and which can swim at peak speeds of about 2 to 5 knots. The gathering is called discrete, because the trawl-net must only be fishing at the desired time or in the desired place, and not operating to gather micro-necton inopportunely, in particular while the trawl-net is going down and/or going up; it is necessary then for this trawl-net to have controlled opening and closing features.

The control of this opening or closing offers in itself no difficulty; there exists on the market devices responding to the pressure, for example by a piston shearing a gauged stud, and clock movements for control depending on the time.

On the other hand, there have existed for a long time trawl-nets for gathering (non discretely) micro-necton; by way of example, such a trawl-net may have at its mouth an opening of the order of 9 m$_2$, with, in front of the mouth, a dihedral diving panel having corresponding dimensions; it is then very difficult to open and then close this mouth while the trawl-net is trawled at depth. Certain trawl-nets of same size but of different design have indeed a mouth with controlled opening and closing, but such trawl-nets are difficult to use and slow, which makes them less efficient for fishing and only selects the smallest size organisms of micro-necton.

In the present state of the known technique, it has been proposed to divide the mouth of the trawl-net by a middle dividing wall made from net, which is applied first of all at the bottom, then at the top of the net; but the reverse movement is not provided for and cannot be so because of the hydrodynamic thrust on the dividing wall; thus, the trawl-net is indeed closed while it is going down, but it remains open when coming up, contaminating the deep harvest.

Another proposal is to open and close the collector, which has a small cross-section; but this collector produces immediately upstream, that is to say at the bottom of the trawl-net, a local increase of the hydrodynamic pressure, which deforms this bottom into a collecting pocket on the walls of which the organisms captured by the mouth flatten themselves instead of sliding into the collector; the selection obtained is thus illusory.

SUMMARY OF THE INVENTION

The present invention has accordingly as its principal aim to provide a trawl-net, able to be used particularly for the selective gathering of pelagic micro-necton, which answers better the requirements of practice than the previously known trawl-nets aiming at the same purpose, particularly in that its use and its speed remain those of a non-selective trawl-net, in that its opening and closing are positively ensured and in that it is free from untimely distortion and pocketing.

The present invention has for its subject matter a controlled opening and closing trawl-net, usable particularly for selectively gathering pelagic micro-necton, as well as for the gathering of pelagic plankton, comprising a net, a dihedral diving panel and a back bar at the mouth of this net, a trawl-net bottom and a collector, said trawl-net being characterized in that it comprises on the one hand, between the net and the bottom, an opening and closing mechanism provided with a first control means, said mechanism holding the entrance of the bottom closed while leaving the rear of the net open then under the action of its control means causing the rear of the net to communicate with the entrance to the bottom and, on the other hand, a folding over-closing system provided with a second control means which, under the action of its control means, lets the mouth fold back rearwards, then ensures by means of a stopper, the closing of said mouth.

Passing from closing to opening of the mechanism takes place once the lowering of the trawl-net has been ended and the fishing action then begins; the passage to the folding over-closing of the system terminates the fishing action and takes place before the trawl-net is pulled up. The two control means may be means responding to the pressure (the first responding to a maximum pressure and the second to a minimum pressure), or clock movements (the first operating before the second).

Thus, while the trawl-net in accordance with the present invention, is being lowered, the water passes through the net and freely leaves through the rear of the net, and since the entrance of the bottom is closed, nothing goes into the bottom nor into the collector; during the fishing action, the configuration of the trawl-net is perfectly normal; and after the fishing action, the mouth is positively closed by the stopper, no gathering can take place and the drag of the trawl-net is greatly reduced, which constitutes an additional advantage.

According to a preferred embodiment of the trawl-net which forms the subject matter of the present invention, the opening-closing mechanism comprises a frame made from angle-irons closed by plates on its four sides, and in this frame, a door able to swing from the horizontal position to the vertical position about a transverse hinge mounted at the rear and at the bottom of the frame, the rear of the net being fixed on the periphery of the front face of the frame, the entrance to the bottom being fixed on the periphery of the door while passing through the rear face of the frame, the first control means holding the door in a horizontal position, then freeing it with rubber extensible springs biasing the door towards the vertical position, with latches locking the door in the vertical position and with positive floatation means relieving the weight of the mechanism.

According to a preferred embodiment of the trawl-net which forms the subject matter of the present invention, the back bar carries the second control means, as well as two hooks each holding a back lug and a rubber extensible spring maintaining a float against the back bar, the whole being freed by the action of this second control means, the back cord and the side ropes of the mouth being weighted with lead; the stopper is a piece of net, drawn by one edge on the foot-rope of the mouth and maintained folded under a cloth sheath one edge of which is sawn on the foot-rope of the mouth and the opposite edge of which is provided with eyelets through which pass small chains, one end of each chain being sawn on the foot-rope of the mouth and the other end having therethrough a double running keeper; and the floats are each fixed at the end of a rein going to the rear of the net where the reins are fastened by a coupling end piece and coming back to the front of the net where they are fixed to a free corner of the stopper, one of these two reins passing, on its way back, into a central loop of the double running keeper.

According to a preferred embodiment of the trawl-net which forms the subject matter of the present invention, the collector comprises a gauze bag in the shape of an inversed cone and a polyethylene tube with wide perforations, surrounding and protecting the gauze bag.

According to yet another preferred embodiment of the controlled closing and opening trawl-net according to the invention, the trawl-net is fixed on the closing-opening mechanism at the rear end of the trawl-net by a connecting canvas.

According to an advantageous arrangement of this embodiment, the connecting canvas is formed by a strip of canvas advantageously plasticized, having a substantially cylindrical shape, inside which there is fixed, by any apropriate techniques, and particularly by sewing, a canvas flap, which constitutes a cover canvas, and which forms a nozzle of relatively large diameter bearing on the sides of the front frame of the closing-opening mechanism.

According to another advantageous arrangement of this embodiment, the connecting canvas is protected by a pocket or similar of plasticized canvas fixed by any appropriate techniques under the lower edge of the frame of the closing-opening mechanism.

Besides the arrangements mentioned above, the invention comprises further arrangements which will become clear from the following description.

The invention relates more particularly to trawl-nets with controlled opening and closing, as well as means adapted to the construction of these trawl-nets and installations using these trawl-nets, particularly for selectively gathering pelagic micro-necton and pelagic plankton.

BRIEF DESCRIPTION OF THE DRAWINGS

The invention will be better understood with the help of the complement of description which follows, which refers to the accompanying drawings in which:

FIG. 1 is a general perspective view of a trawl-net in accordance with the invention, the parts of the trawl-net being in the positions which they occupy before the fishing action;

FIG. 2 represents the same trawl-net, with the parts in the positions which they occupy during the fishing action;

FIG. 5 is a perspective view, seen from the rear, of the back bar of the trawl-net of FIG. 1, the parts being shown, those on the right hand side in their positions before the end of the fishing action and those on the left hand side in their positions after the fishing action;

FIG. 6 is a perspective view of the closing-opening mechanism of the trawl-net of FIG. 1, but without its closing plates, so as to show the internal arrangements;

It will of course be understood that these drawings and the corresponding descriptive parts are given solely by way of illustration of the subject matter of the invention, of which they form in no wise a limitation.

DETAILED DESCRIPTION OF THE PREFERRED EMBODIMENTS

Figure 3:
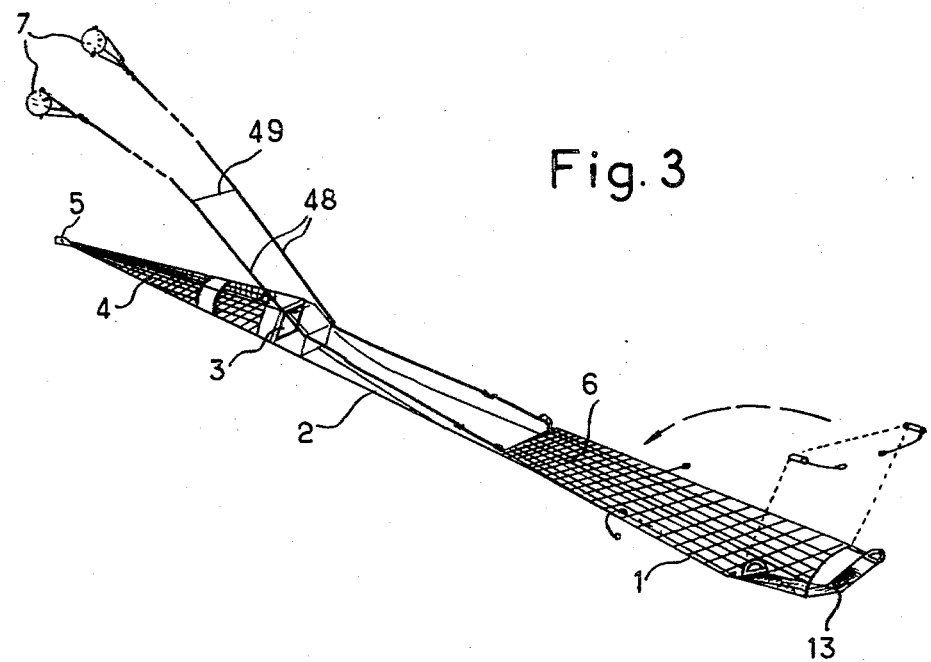
FIG. 3 shows again the same trawl-net, but with its parts in the positions which they occupy after the fishing action.

FIGS. 1, 2 and 3 give a general idea of a trawl-net in accordance with the present invention. FIG. 1 shows it before the fishing action, in particular while it is being lowered; the mouth 1 of net 2 is open and, at the rear of net 2, the door of the closing-opening mechanism 3 is in a horizontal position (as described in detail further on), maintaining the entrance of bottom 4 and of collector 5 closed, whereas the water entering by mouth 1 can freely leave by the rear of net 2.

To begin the fishing action, the door of the closing-opening mechanism 3 is raised (as described in detail further on); thus, the net 2 leads to bottom 4 and to collector 5 (FIG. 2), and the trawl-net fishes normally.

To end the fishing action, the mouth 1 of net 2 is freed and folds back rearwards (FIG. 3), net 2 collapses, then a net stopper 6 drawn by two floats 7 unfolds (as described in detail further on) and ensures the complete closing of mouth 1. Thus, the trawl-net can no longer fish, in particular while it is being pulled up.

Net 2 may be conventional, or with reduced meshes; it comprises no metal hoop, it is girdled by reinforcement straps on the longitudinal ropes made from strong webbing.

Figure 4:
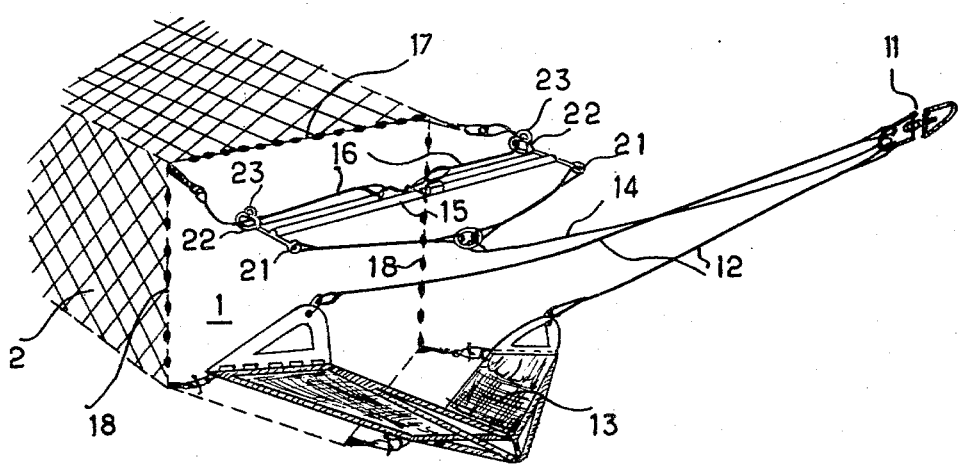
FIG. 4 is a perspective view of the rigging of the trawl-net according to FIG. 1.

The rigging of the trawl-net (FIG. 4), made from steel cable, comprises conventionally, a head swivel 11, pulling by two warps 12, the dihedral diving panel or shut-off 13 and by a cable 14 the back bar 15; according to the present invention, this back bar 15 is elongated and formed by a steel tube stiffened by a flat iron strip; it holds, by means of two releasable lugs 16, the back rope 17 (at the top of mouth 1), which is weighted with lead, as well as the side ropes 18 of mouth 1; these lead weights facilitate the flattening of mouth 1 when, to end the fishing action, the back bar 15 releases lugs 16 (as described in detail herebelow).

The back bar 15, shown in a rear view in FIG. 5, carries at each end three rings; one ring 21 near the front, where the bar sling going to cable 14 is fastened, one ring 22 towards the rear, in which the releasable lug 16 may slide, and a ring 23 towards the rear, in which the rubber extensible spring 24 of float 7 of stopper 6 may slide. On the middle of back bar 15 is mounted the second control device 25 (that for the end of the fishing action) which may be, as shown, a shearing cylinder of a gauged stud. This device 25 then draws a bolt 26, which frees a longitudinal lever 27, which frees, in its turn, two hooks 28; in FIG. 5, hook 28 is shown in its closed position, where it holds the releasable lug 16 and the rubber extensible spring which itself holds float 7 against the back bar 15, and hook 28 is shown in its freed position, in which it has freed the releasable lug 16 and the rubber extensible spring 24.

The closing-opening mechanism 3 (FIG. 6) will now be described. This mechanism comprises a frame made from metal angle-irons, closed on its four sides by riveted plates (not illustrated so as to show the internal arrangements). Net 2 of the trawl-net is fixed on this frame, by means of a connecting canvas which will be described further on and studs 31 welded to the front frame of the mechanism. In this frame swings a door 32, pivoted transversely at the bottom of the rear frame of the mechanism on hinges 33; the bottom 4 of the trawl-net is bolted to door 32, by means of a border canvas (not shown). While the trawl-net is being lowered, door 32 is maintained biassed against the lower face of mechanism 3 (FIG. 1) by the first control device 34 (FIG. 6), which may be a clock movement or a gauged stud shearing cylinder. At the desired moment or at the desired depth, device 34 frees door 32, which is raised (arrow) under the action of rubber extensible springs 35; thus begun, this movement is supported by the hydrodynamic thrust of the water in bottom 4 and door 32 is pressed against the rear frame where it is locked in latches 36: the bottom 4 is then in the fishing position (FIG. 2). It is indispensable to improve the buoyancy of this mechanism, whose weight could, at low speeds, bend the rear of the trawl-net downwards; for this purpose, the closing-opening mechanism 3 is provided with cylinders 37 containing glass spheres, or with equivalent buoyancy-improving device or devices.

Figure 10:
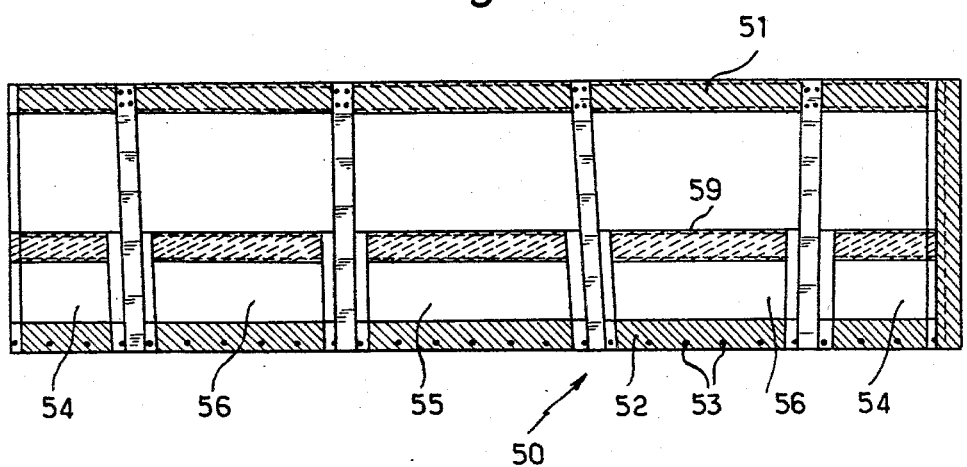
FIG. 10 is a plan view of the canvas for connecting the trawl-net to the closing-opening mechanism of the invention.
Figure 11:
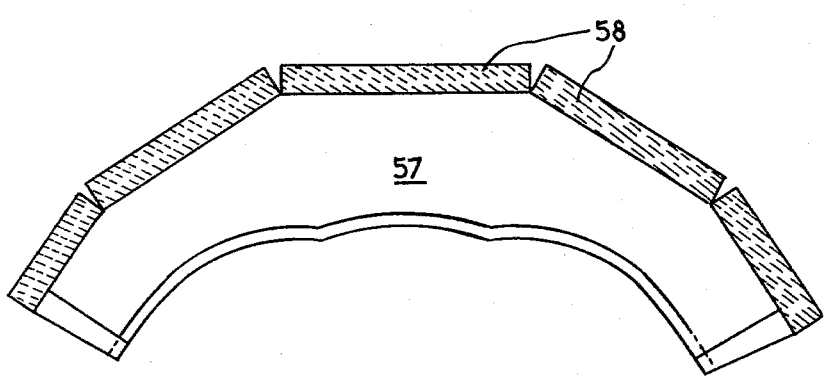
FIG. 11 is a plan view of the cover canvas associated with the connecting canvas of FIG. 10.

The fastening of the rear end of the trawl-net on the closing-opening mechanism in accordance with the invention is achieved by a connecting canvas 50 (cf. FIG. 10), which is advantageously formed by a strip of plasticized nylon canvas, which is connected at its front part, to the rear end of the trawl-net, by a connecting strip 51 and at its rear end to the closing-opening mechanism by a border 52 comprising eyelet holes 53 for fixing the connecting canvas 50 to the closing-opening mechanism. A canvas cover flap 57 (cf. FIG. 11) is sewn to the connecting canvas 50, at 58 in zone 59 of this latter. The connecting canvas 50, such as it is positioned between the rear end of the trawl-net and the front frame of the closing-opening mechanism, has a substantially cylindrical shape, the ends 54 of the canvas shown in a plan view in FIG. 10 forming the top, part 55 the bottom and parts 56 the side faces of the "cylinder". The cover canvas 57 sewn to the inner side of said cylinder forms a sort of wide nozzle which narrows down onto the sides of the front frame of the closing-opening mechanism, thus preventing the organisms from sticking in the junction slot between the connecting canvas and the mechanism. A "cowhide" or other similar protection pocket (not shown), bolted under the lower edge of the front frame of the mechanism, protects the connecting canvas.

Figure 7:
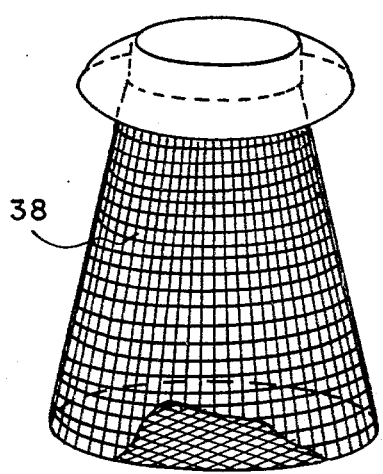
FIG. 7 shows the gauze bag of the collector of the trawl-net of FIG. 1.
Figure 8:
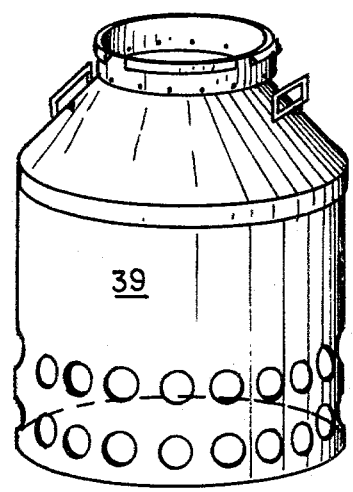
FIG. 8 shows the protecting tube for the collector of the trawl-net of FIG. 1.

Bottom 4 (FIG. 1), of the same mesh as net 2, ends in a collector 5. This latter comprises a gauze bag 38, in the shape of an inverted cone (FIG. 7), closed in a polyethylene tube 39 with large perforations (FIG. 8) which protects it.

Figure 9:
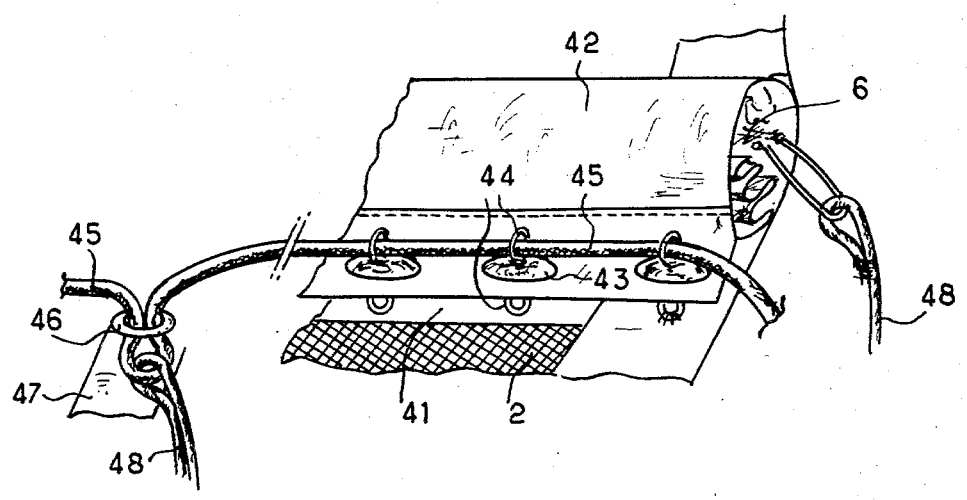
FIG. 9 is a detail view in perspective, seen from the rear, showing the stopper of the trawl-net of FIG. 1 in its position before the end of the fishing action.

When, at the end of the fishing action, bar 15 releases the two releasable lugs 16, mouth 1 of the trawl-net is flattened, but because of the dihedral form of the shut-off 13 (FIG. 1), the back cord 17 would curl up while letting an opening of 1 to 2 m$_2$ appear; to avoid this serious defect, the trawl-net of the invention is provided with a stopper 6. This stopper 6 is a large piece of net, sewn by one side to the foot-rope 41 of mouth 1 (FIGS. 1 and 9). While the trawl-net is being let down and during fishing, this stopper 6 is maintained folded under a canvas sheath 42, sewn by one edge to the foot-rope 41 (FIG. 9), and provided, on its free edge, with eyelet holes 43; through each eyelet hole 43 passes a small chain 44, sewn by one end to rope 41, and through whose other end passes a double running keeper 45; the middle of the running keeper 45 passes through shackle 46 fixed on the bottom middle rope 47 and loops itself around one of the reins 48 of the floats 7; these reins 48 are fixed, towards the front of net 2, to the free angles of stopper 6 (FIG. 1); from the front, they go to the rear of the net 2 where they are fastened by a coupling end piece 49 and return to the front of the net 2 where they each hold a float 7 (FIG. 5). When, at the end of the fishing action, bar 15 frees releasable lugs 16, it also frees the rubber extensible springs 24 which held, back floats 7; these floats go towards the rear of the trawl-net and, with a delay which, adjusted by the length of reins 48, allows net 2 to be suitably flattened, open sheath 42 and free running keeper 45; then floats 7 unfold and pull stopper 6 which now covers net 2 and maintains it closed (FIG. 3).

The control devices 25 and 34 are commercially available and will not be described.

It follows from the preceding description that, whatever the embodiments and modes of application adopted, trawl-nets are provided which present, with regard to the previously known trawl-nets answering the same purpose, important advantages, the principal ones of which have been mentioned above and which will appear, as well as other advantages, during use of the trawl-nets in accordance with the present invention.

As follows from what has gone before, the invention is in no way limited to those of its embodiments and modes of application which have just been more explicitely described; it embraces, on the contrary, all variations thereof which may come to the mind of the man skilled in the art, without departing from the spirit nor the scope of the present invention, for example by replacing the control devices depending on pressure or time by control devices depending on other parameters or by remote control devices.

What is claimed is:

1. In a trawl-net apparatus with controlled opening and closing, useable particularly for selectively gathering pelgic micro-nection, the apparatus including a net having a mouth, a rear portion, a diving panel and a back bar at said mouth, the net being continued at said rear portion with a trawl-net bottom and a collector, the improvement wherein said rear portion of said net is connected to an entrance of said trawl-net bottom by a frame chamber provided with a swivellable door having a central opening, sides of said entrance of said trawl-net bottom being fixed on said door around said central opening; wherein said rear portion of said net is fixed to an entrance of said frame chamber, said door in a horizontal position in said frame chamber, closing said trawl-net bottom by flattening same and leaving said rear portion of said net in communication with space outside of said frame chamber and said door in a vertical position closing an outlet of said frame chamber providing communication between said rear portion of said net and an inlet of said trawl-net bottom by opening of said door; and wherein said frame chamber is provided with a locking device for maintaining said door in the horizontal position and with swivelling means for swivelling said door to the vertical position after unlocking; and including a first automatic control means operatively coupled to said locking device for initiating movement of said door from the horizontal position to the vertical position; and wherein said net is provided with a folding backclosing system including a second automatic control means for letting said mouth of said net fold back rearwardly, and stopper means for closing said mouth, said stopper means being responsive to said second automatic control means.

2. In a trawl-net apparatus according to claim 1, wherein said frame chamber is made of an angle-iron frame and said door is swivellable in the vicinity of said outlet of said frame chamber, said swivelling means including rubber extensible springs biasing said door towards the vertical position and closing said chamber, and further including latches to lock said door in the vertical position, and bouyancy means relieving the weight of said frame chamber.

3. A trawl-net apparatus according to claim 1 or claim 2, wherein said back bar carries said second control means, as well as two hooks each holding a releaseable lug and an extensible rubber spring maintaining a float against said back bar, each said releaseable lug, said spring and said float being freed by an action of said second control means, a back cord and at least one side rope of said mouth being weighted with lead.

4. A trawl-net apparatus according to claims 1 or claim 2, wherein said stopper means is a piece of net, sewn by one edge to a foot-rope of said mouth and maintained folded under a canvas sheath one edge of which is sewn to said foot-rope of said mouth and whose opposite edge is provided with eyelet holes through which pass small chains, one end of each small chain being sewn on said foot-rope of said mouth and the other end having therethrough a double running keeper.

5. A trawl-net apparatus according to claim 1 or claim 2, including a first rein and a second rein, respective floats fixed at an end of respective said reins, said reins going to said rear portion of said net where they are fastened by a coupling end piece and extending back to said mouth of said net where they are fixed to said stopper means.

6. A trawl-net according to claim 1 or claim 2, wherein said first control means comprises a clock movement, said locking device being coupled to said clock movement.

7. A trawl-net apparatus according to claim 1 or claim 2, wherein said collector comprises a gauze bag, in the form of an inverted cone and a polyethylene tube with wide perfortions, surrounding and protecting said gauze bag.

8. A trawl-net apparatus according to claim 1 or claim 2, wherein the rear portion of said net is connected to said frame chamber by a connecting canvas.

9. A trawl-net apparatus according to claim 8, wherein said connecting canvas is formed by a strip of canvas advantageously plasticized having a substantially cylindrical shape, inside which there is fixed a canvas flap, which constitutes a cover canvas and which forms a nozzle of a relatively large diameter bearing on the sides of the front of said frame chamber.

10. A trawl-net apparatus according to claim 9, wherein said connecting canvas is protected by a plasticized canvas fixed under a lower edge of said chamber.

11. A trawl-net apparatus according to claim 1 or claim 2, wherein said second control means comprises a clock movement.

* * * * *